United States Patent [19]

Campbell et al.

[11] Patent Number: 4,973,628
[45] Date of Patent: Nov. 27, 1990

[54] METHOD FOR PREPARING BLOCK POLYPHENYLENE ETHER-POLYCARBONATES

[75] Inventors: John R. Campbell, Clifton Park; Timothy J. Shea, Schenectady, both of N.Y.

[73] Assignee: General Electric Company, Schenectady, N.Y.

[21] Appl. No.: 407,002

[22] Filed: Sep. 14, 1989

[51] Int. Cl.[5] .................... C08G 65/48; C08L 69/00; C08L 71/12
[52] U.S. Cl. .................................. 525/394; 525/68; 525/92; 525/132; 525/152; 525/391; 525/392; 525/905
[58] Field of Search ................................ 525/394, 905

[56] References Cited

U.S. PATENT DOCUMENTS

| | | |
|---|---|---|
| 4,323,668 | 4/1982 | Brunelle . |
| 4,374,233 | 2/1983 | Loucks et al. . |
| 4,377,662 | 3/1983 | Loucks . |
| 4,760,118 | 7/1988 | White et al. ................ 525/394 |

*Primary Examiner*—Jacob Ziegler
*Attorney, Agent, or Firm*—William H. Pittman; James C. Davis, Jr.

[57] ABSTRACT

Block polyphenylene ether-polycarbonate copolymers are prepared by the reaction of a salicylate-terminated polycarbonate with a polyphenylene ether in the presence of a polycarbonate-forming transesterification catalyst. The reaction may be conducted in solution or in the melt, typically at temperatures in the range of about 100°–300° C. The preferred catalysts are tetraarylborates, especially tetraalkylammonium tetraarylborates.

19 Claims, No Drawings

METHOD FOR PREPARING BLOCK POLYPHENYLENE ETHER-POLYCARBONATES

This invention relates to the preparation of block polyphenylene ether-polycarbonates by a method adaptable to melt processing.

It is known that blends of various polymers can be compatibilized by the incorporation therein of a copolymer of the polymers constituting the blend. Thus, for example, blends of polycarbonates and polyphenylene ethers are compatibilized by incorporating therein a polycarbonatepolyphenylene ether copolymer.

Block copolymers of polyphenylene ethers and polycarbonates are disclosed, for example, in U.S. Pat. Nos. 4,374,233 and 4,377,662. The method for their preparation is essentially the interfacial method for preparing polycarbonates in a mixed aqueous-organic system, with the polyphenylene ether being employed as an additional reactant. Thus, said method may be considered an "endcapping" reaction in which the endcapping agent is the polyphenylene ether. This method is, however, not convenient to practice on a large scale with the preferred organic liquid, methylene chloride, since it forms an insoluble complex with polyphenylene ethers. Other methods for preparing similar block copolymers, such as the one disclosed in copending, commonly owned application Ser. No. 140,522, filed Jan. 4, 1988, now U.S. Pat. No. 4,902,753, result in chain scission of the polycarbonate and thus produce block copolymers of low molecular weight, particularly in the polycarbonate blocks.

Thus, there is a continuing need for a convenient method of preparing such block copolymers, and especially copolymers having polycarbonate blocks of high molecular weight. In particular, a method for preparation of such copolymers which may be performed in the melt is desired. The present invention provides such a method.

Accordingly, the invention is a method for preparing a polycarbonate-polyphenylene ether block copolymer which comprises effecting reaction between a polyphenylene ether and a salicylate-terminated polycarbonate in the presence of an effective amount of a polycarbonate-forming transesterification catalyst.

Other than in their end group structure, the polycarbonates employed in the method of this invention are conventional. They include all polycarbonates, sterically hindered and non-sterically hindered, disclosed in the aforementioned U.S. Pat. Nos. 4,374,233 and 4,377,662, the disclosures of which are incorporated by reference herein. They may be considered as comprising structural units of the formula

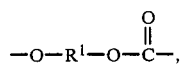
(I)

wherein each $R^1$ is independently a divalent organic radical. Preferably, at least about 60% of the total number of $R^1$ values are aromatic radicals, the balance thereof being aliphatic, alicyclic or aromatic radicals.

The $R^1$ values may be different but are usually the same, and may be aliphatic, alicyclic, aromatic or mixed; those which are aliphatic or alicyclic generally contain up to about 8 carbon atoms. Suitable $R^1$ values include ethylene, propylene, trimethylene, tetramethylene, hexamethylene, dodecamethylene, 1,4-(2-butenylene), 1,10-(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propane, benzene-1,4-dimethylene (which is a vinylog of the ethylene radical and has similar properties) and similar radicals. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $R^1$ radicals are hydrocarbon radicals.

Preferably at least about 80% of the total number of $R^1$ values, and most desirably all of said $R^1$ values, are aromatic. The aromatic $R^1$ radicals preferably have the formula $$-A^1-Y-A^2- \quad (II)$$

wherein each of $A^1$ and $A^2$ is a monocyclic divalent aromatic radical and Y is a bridging radical in which one or two atoms separate $A^1$ from $A^2$. The free valence bonds in formula II are usually in the meta or para positions of $A^1$ and $A^2$ in relation to Y.

The $A^1$ and $A^2$ values may be unsubstituted phenylene or substituted derivatives thereof. Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated $C_{1-12}$ aliphatic or alicyclic radical such as methylene, cyclohexylmethylene, [2.2.1]bicycloheptylmethylene, ethylene, ethylidene, 2,2-propylidene, 1,1-(2,2-dimethylpropylidene), cyclo-hexylidene, cyclopentadecylidene, cyclododecylidene or 2,2-adamantylidene, especially an alkylidene radical. Aryl-substituted radicals are included, as are unsaturated radicals and radicals containing atoms other than carbon and hydrogen; e.g., oxy groups. Substituents may be present on the aliphatic, alicyclic and aromatic portions of the Y group.

Both homopolycarbonates and copolycarbonates may be employed, as well as copolyestercarbonates. Most preferably, they are bisphenol A homo- and copolycarbonates, in which, in at least a portion of the structural units, each of $A^2$ and $A^3$ is p-phenylene and Y is isopropylidene. The bisphenol A homopolycarbonates are often especially preferred by reason of their availability and excellent properties.

The salicylate-terminated polycarbonates employed in the method of this invention are characterized by the presence in their molecular structure of end groups of the formula

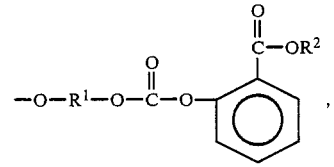
(III)

wherein $R^1$ is as previously defined and $R^2$ is a $C_{1-8}$ alkyl or aryl radical. Illustrative alkyl radicals are methyl, ethyl, 1-propyl, 2-propyl, 1-butyl, isobutyl, 2-butyl and 2-hexyl, and illustrative aryl radicals are phenyl, chloro-phenyl and tolyl. The $C_{1-4}$ primary alkyl radicals are preferred, with methyl being most preferred.

Said polycarbonates may be prepared by a transesterification reaction between a bisphenol and a salicylate carbonate, as disclosed in U.S. Pat. No. 4,323,668. However, it is usually preferred to prepare them by the reaction of an organic dihydroxy compound, particularly a dihydroxyaromatic compound such as a bisphenol, with phosgene in the presence of a salicylate chloroformate of the formula

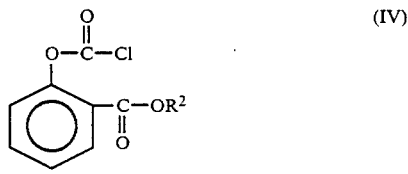

as a chain termination agent (hereinafter sometimes "chainstopper"). This method is disclosed and claimed in copending, commonly owned application Ser. No. 07/407,085.

Preparation of the salicylate-terminated polycarbonate by phosgenation may be achieved under conventional interfacial conditions, employing as an organic solvent a substantially water-immiscible organic liquid such as methylene chloride. Said reaction occurs in an alkaline medium, in the presence of a tertiary amine such as triethylamine as catalyst. It may be conducted in one step, employing phosgene in combination with the dihydroxy compound and the chainstopper. It may also be conducted in two steps, first preparing a bischloroformate oligomer composition by reaction of the bisphenol with phosgene under alkaline conditions, and subsequently adding the catalyst and converting said bischloroformate composition to a polycarbonate, as described, for example, in U.S. Pat. Nos. 4,737,573 and 4,743,676, the disclosures of which are incorporated by reference herein.

The proportion of chainstopper is selected so as to produce a polycarbonate of the desired molecular weight, and can be readily determined on that basis by routine experimentation. About 1-10 and preferably about 2-5 mole percent, based on bisphenol, is generally employed.

Prior to the present invention, molecular weight control of polycarbonates prepared by phosgenation was typically effected by employing a monohydroxyaromatic compound such as phenol as a chainstopper. Salicylic acid esters such as methyl salicylate, although also monohydroxyaromatic compounds, are generally ineffective as chainstoppers since they are not reactive enough to function satisfactorily. However, it is possible to effect in situ conversion of a salicylate ester to the corresponding chloroformate by phosgenating an alkaline mixture of the bisphenol and salicylate ester and subsequently adding the catalyst and proceeding with polycarbonate formation.

The weight average molecular weight of the salicylate-terminated polycarbonate is generally at least about 25,000 and preferably at least about 40,000. There is no real upper limit for molecular weight, but values above about 200,000 are not readily available.

The preparation of salicylate-terminated polycarbonates is illustrated by the following examples. All polycarbonate molecular weights are weight average and were determined by gel permeation chromatography relative to polystyrene.

EXAMPLE 1

A 500-ml. Morton flask equipped with a stirrer, a nitrogen-blanketed condenser, a phosgene inlet, a caustic addition funnel and a pH probe was charged in a nitrogen atmosphere with 29.6 grams of bisphenol A, 70 ml. of methylene chloride, 55 ml. of water, 2 ml. of a 5% aqueous solution of triethylamine and 975 mg. of o-carbomethoxyphenyl chloroformate. The pH of the mixture was increased to 11 by the addition of 50% aqueous sodium hydroxide solution, and phosgene was added at 0.8 gram per minute, with stirring, while the pH was maintained in the range of 10.5-12 by the addition of additional sodium hydroxide solution. After 25 minutes, addition of phosgene was stopped and the pH was adjusted to 9.0. The desired salicylate-terminated polycarbonate was diluted with methylene chloride and the organic layer was removed, washed with dilute aqueous hydrochloric acid and extensively with water, precipitated by pouring into methanol, filtered and dried. It had a molecular weight of 41,000.

EXAMPLE 2

The procedure of Example 1 was repeated, except that no triethylamine was added initially. Phosgenation was conducted for 20 minutes in the pH range 11.5-12.5, after which the triethylamine was added and polymerization was conducted at a pH in the range of 11-12 for 8 minutes. A similar product, having a molecular weight of 50,000, was obtained.

The polyphenylene ethers employed in the method of this invention are a well known class of polymers. They are widely used in industry, especially as engineering plastics in applications requiring toughness and heat resistance. Since their discovery, they have given rise to numerous variations and modifications all of which are applicable to the present invention, including but not limited to those described hereinafter.

The polyphenylene ethers comprise a plurality of structural units having the formula

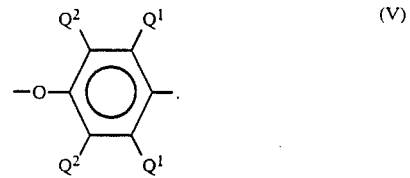

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent, provided substantial proportions of free hydroxy groups remain present. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.15–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

Particularly useful polyphenylene ethers for the purposes of this invention are those which comprise molecules having at least one of the end groups of the formulas

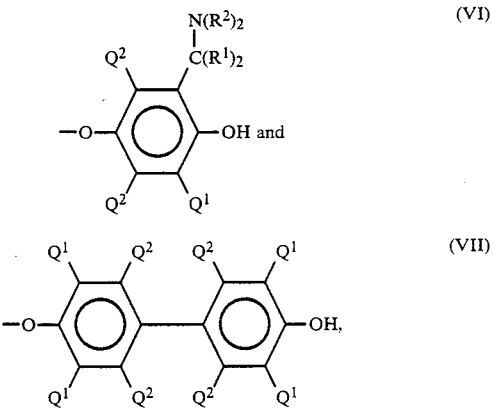

wherein $Q^1$ and $Q^2$ are as previously defined; each $R^2$ is independently hydrogen or alkyl, with the proviso that the total number of carbon atoms in both $R^2$ radicals is 6 or less; and each $R^3$ is independently hydrogen or a $C_{1-6}$ primary alkyl radical. Preferably, each $R^2$ is hydrogen and each $R^3$ is alkyl, especially methyl or n-butyl.

Polymers containing the aminoalkyl-substituted end groups of formula V may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy groups on the terminal unit of the polymer chain. During further processing and/or blending, the aminoalkyl-substituted end groups may undergo various reactions, probably involving a quinone methide-type intermediate of the formula

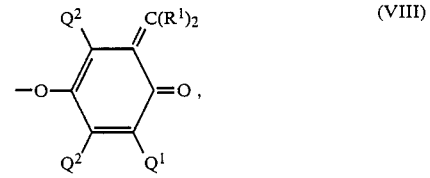

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula VI are typically obtained from reaction mixtures in which a by-product diphenoquinone of the formula

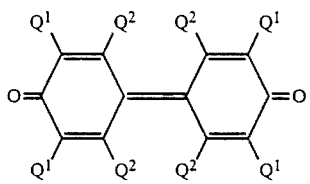

is present, especially in a copper-halide-secondary or tertiary amine system. In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by wight of the polymer, contain end groups having one or frequently both of formulas V and VI. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use in the present invention include all those presently known, irrespective of variations in structural units or ancillary chemical features.

Also required in the method of this invention is a polycarbonate-forming transesterification catalyst. Such catalysts include all those suitable for use in the preparation of polycarbonates by transesterification; for example, from bisphenols and diaryl carbonates or from bisphenol diesters and dialkyl carbonates. Numerous catalysts of this type are disclosed in the prior art. Reference is made, for example, to the aforementioned U.S. Pat. No. 4,323,668 and the following additional patents, the disclosures of which are also incorporated by reference herein: U.S. Pat. Nos. 3,153,008, 3,442,854, 4,345,062, 4,452,968.

Illustrative catalysts are inorganic and organic bases such as sodium hydroxide, sodium hydride, sodium methoxide, sodium borohydride, lithium aluminum hydride, the disodium salt of biphenol A and 1,2,2,6,6-pentamethylpyridine; tetraarylborates such as sodium tetraphenylborate, tetramethylammonium tetraphenylborate and tetra-n-butylammonium tetraphenylborate; and titanates and zirconates such as titanium bis(acetylacetonate), tetraisopropyl titanate and tetraoctyl titanate and the corresponding zirconates. The tetraarylborates, particularly tetraalkylammonium tetraphenylborates, are generally preferred.

The reaction is effected by heating the polyphenylene ether, polycarbonate and catalyst at a temperature usually within the range of about 100°–300° C. Either solution or melt reaction conditions may be employed. Solution reactions are preferably conducted using a high boiling solvent such as o-dichlorobenzene or 1,2,4-trichlorobenzene, but may also take place in lower boiling solvents under pressure. Melt reactions may be conducted in conventional equipment therefore, illustrated by Helicone mixers and extruders.

The proportions of reagents used are not critical and will depend largely on the proportions of polyphenylene ether and polycarbonate moieties desired in the copolymer. For the most part, a weight ratio of polyphenylene ether to polycarbonate in the range of about 0.5–2.0:1 is suitable. The proportion of catalyst is generally about 0.1–2.0% by weight based on polycarbonate.

It is believed that copolymer formation occurs according to the present invention by nucleophilic substitution of the polyphenylene ether for the salicylate end group on the polycarbonate. This reaction is facilitated by the high activity of the salicylate anion as a leaving group. The product thus obtained generally also contains residual homopolymeric polycarbonate and polyphenylene ether. If the reaction has been conducted in solution, the polymeric product may be isolated by conventional operations, typically including precipitation with a non-solvent such as methanol. Some separation of homopolymer reactants from copolymer may then be achieved by treatment with methylene chloride. Homopolycarbonate, being soluble in methylene chloride, will remain in solution while homopolymeric polyphenylene ether will be precipitated as the methylene chloride complex, accompanied by at least a portion of the copolymer product.

Since any polycarbonate present in the methylene chloride complex may be assumed to be copolymer, the proportion of copolymer may be determined from the results of proton nuclear magnetic resonance analysis. The methylene chloride solution is also often found to contain polyphenylene ether, probably as copolymer in which the polycarbonate portion predominates. When this is the case, the polymeric contents of the solution may be similarly analyzed.

The method of this invention is illustrated by the following examples.

EXAMPLES 3–4

Mixtures of 5 grams of a poly(2,6-dimethyl-1,4-phenylene ether) having a number average molecular weight of about 20,000, 5 grams of methyl salicylate-terminated bisphenol A polycarbonates similar (except in molecular weight) to the product of Example 1, 20 mg. of tetra-n-butylammonium tetraphenylborate and 75 ml. of 1,2,4-trichlorobenzene were heated in a nitrogen atmosphere for 1 hour at 200° C., with stirring. They were then cooled and the polymers were isolated by pouring into methanol followed by filtration.

Dried 5-gram samples of the polymeric products were dissolved in 100 ml. of methylene chloride and the solutions were cooled in a refrigerator for 4 hours, whereupon the polyphenylene ether-methylene chloride complexes precipitated. They were removed by filtration and washed with methylene chloride; the filtrates and washings were concentrated to dryness. Both the methylene chloride-soluble and insoluble fractions were analyzed by proton nuclear magnetic resonance to ascertain the proportions of polycarbonate and polyphenylene ether therein. The weight average molecular weights of the methylene chloride-soluble fractions were also determined.

The results are given in Table I, in comparison with two controls. In Control A, a simple blend of equal weights of polyphenylene ether and a phenol-chain-stopped polycarbonate was similarly treated with methylene chloride. In Control B, the methyl salicylate-terminated polycarbonate of Example 3 was replaced by a phenol-chainstopped polycarbonate.

TABLE I

|  | Example | | Control | |
|---|---|---|---|---|
|  | 3 | 4 | A | B |
| Chainstopped polycarbonate, Mw | 30,000 | 65,200 | 29,000 | 29,000 |
| Soluble fraction: | | | | |
| Polyphenylene ether, % | 20 | 40 | 0 | 13 |
| Mw | 42,000 | 48,000 | — | 17,000 |
| Insoluble fraction: | | | | |
| Polycarbonate, % | 34 | 27 | 0 | 19 |

The results in Table I show a substantial proportion of polycarbonate in the insoluble fraction and polyphenylene ether in the soluble fraction in Examples 3–4, and also a substantial increase in molecular weight of the soluble fraction as compared to the polycarbonate used as reactant. This is strong evidence of the formation of the desired block copolymers. On the other hand, no copolymer formation was noted in Control A and a substantial amount of chain scission took place in Control B.

EXAMPLE 5

A mixture of 120 grams of the polyphenylene ether of Example 3, 150 grams of a salicylate-terminated polycarbonate similar, except in molecular weight, to the polycarbonate employed in that example and 3 grams of tetra-n-butylammonium tetraphenylborate was extruded on a twin-screw extruder at a screw speed of 400 rpm. and temperatures in the range of 120°–260 ° C. Workup and analysis were performed as in Example 3, except that molecular weights of both the soluble and insoluble fractions were determined.

EXAMPLE 6

A small Helicone reactor was charged with 20 grams each of the polyphenylene ether of Example 3 and a salicylate-terminated polycarbonate similar, except in molecular weight, to the polycarbonate employed in that example and 80 mg. of tetra-n-butylammonium tetraphenylborate. The mixture was heated under nitrogen for minutes at 293° C. It was then worked up and analyzed as described in Example 5. Comparison was made with a control in which a phenol-chainstopped polycarbonate was employed.

The results of Examples 5–6 are given in Table II.

TABLE II

|  | Example | | Control |
|---|---|---|---|
|  | 5 | 6 | |
| Chainstopped polycarbonate, Mw | 60,000 | 32,000 | 29,000 |
| Reactor: | | | |
| Identity | Extruder | Helicone | Helicone |
| Residence time, min. | 1.5 | 18 | 18 |
| Soluble fraction: | | | |
| Polyphenylene ether, % | 17 | 15 | 21 |
| Mw | 19,400 | 16,100 | 15,100 |
| Insoluble fraction: | | | |
| Polycarbonate, % | 20 | 20 | 12 |
| Mw | 23,300 | 34,000 | 16,200 |

It is apparent that both fractions of Example 6 contained polymers of higher molecular weight than those of the control, indicating a lesser degree of chains scission. The results of Example 5 show that substantial levels of copolymer are formed even with the shorter residence times characteristic of extrusion operations.

What is claimed is:

1. A method for preparing a polycarbonate-polyphenylene ether block copolymer which comprises effecting reaction between a polyphenylene ether and a salicylate-terminated polycarbonate having structural units of the formula

and end groups of the formula

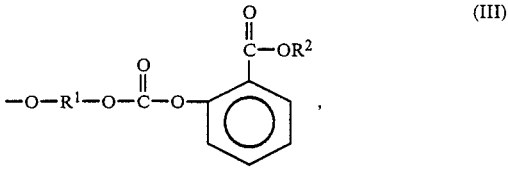

wherein $R^1$ is a divalent organic radical and $R^2$ is a $C_{1-8}$ alkyl or aryl radical, in the presence of an effective amount of a polycarbonate-forming transesterification catalyst.

2. A method according to claim 1 wherein the catalyst is a tetraarylborate.
3. A method according to claim 2 wherein the reaction temperature is in the range of 100°–300° C.
4. A method according to claim 3 wherein the reaction is conducted in solution.
5. A method according to claim 4 wherein the polyphenylene ether is a poly(2,6-dimethyl-1,4-phenylene ether).
6. A method according to claim 5 wherein the polycarbonate is a bisphenol A polycarbonate.
7. A method according to claim 6 wherein $R^2$ is methyl.
8. A method according to claim 7 wherein the catalyst is a tetraalkylammonium tetraphenylborate.
9. A method according to claim 3 wherein the reaction is conducted in the melt.
10. A method according to claim 9 wherein the polyphenylene ether is a poly(2,6-dimethyl-1,4-phenylene ether).
11. A method according to claim 10 wherein the polycarbonate is a bisphenol A polycarbonate.
12. A method according to claim 11 wherein $R^2$ is methyl.
13. A method according to claim 12 wherein the catalyst is a tetraalkylammonium tetraphenylborate.
14. A method according to claim 4 wherein the proportion of catalyst is about 0.1–2.0% by weight based on polycarbonate.
15. A method according to claim 14 wherein the weight ratio of polyphenylene ether to polycarbonate is in the range of about 0.5–2.0:1.
16. A method according to claim 14 wherein the polyphenylene ether is a poly(2,6-dimethyl-1,4-phenylene ether).
17. A method according to claim 16 wherein the polycarbonate is a bisphenol A polycarbonate.
18. A method according to claim 17 wherein $R^2$ is methyl.
19. A method according to claim 18 wherein the catalyst is a tetraalkylammonium tetraphenylborate.

* * * * *